United States Patent [19]
Ikegami

[11] Patent Number: 5,959,435
[45] Date of Patent: Sep. 28, 1999

[54] METHOD AND SYSTEM FOR MONITORING BATTERY

[75] Inventor: Yoshikazu Ikegami, Tokyo, Japan

[73] Assignee: NEC Corporation, Japan

[21] Appl. No.: 08/962,004

[22] Filed: Oct. 31, 1997

[51] Int. Cl.[6] ................................................... H01M 10/46
[52] U.S. Cl. ............................................................. 320/132
[58] Field of Search ..................................... 320/132, 133, 320/134, 136, 149, DIG. 19, DIG. 21, FOR 142, FOR 147; 324/427, 428, 433; 340/635, 636

[56] References Cited

U.S. PATENT DOCUMENTS

| | | | |
|---|---|---|---|
| 4,052,717 | 10/1977 | Arnold et al. ............................ | 320/161 |
| 4,379,990 | 4/1983 | Sievers et al. ........................... | 320/123 |
| 5,325,041 | 6/1994 | Briggs ..................................... | 320/149 |
| 5,646,534 | 7/1997 | Kopera .................................... | 324/434 |
| 5,739,673 | 4/1998 | LeVan Suu ............................. | 320/139 |

*Primary Examiner*—Edward H. Tso
*Attorney, Agent, or Firm*—Ostrolenk, Faber, Gerb & Soffen

[57] ABSTRACT

In a battery-powered electronic apparatus having a microprocessor therein, any task is stopped running on the microprocessor in response to a check timing signal and, after the task is stopped running on the microprocessor, an output voltage of the battery is detected. Subsequently, after resuming the task running on the microprocessor, the remaining quantity of the battery is estimated based on the detected output voltage using a discharge characteristic of the battery.

20 Claims, 4 Drawing Sheets

METHOD AND SYSTEM FOR MONITORING BATTERY

BACKGROUND OF THE INVENTION

1. Field of the Invention

The present invention generally relates to a battery monitor, and in particular to a battery monitoring method and system for use in battery-powered electronic equipment such as a palmtop personal computer using a pen as an input device and a hand-held personal computer.

2. Description of the Related Art

For battery-powered portable electronic apparatuses, it is very important to monitor the remaining quantity of battery power. In the case where a coke-base lithium ion cell is used as a power supply battery, the remaining quantity of the cell can be monitored by measuring the output voltage of the cell under a constant load condition, that is, a constant power consumption condition. In Japanese Utility-Model Unexamined publication No. 5-47871, for example, a battery voltage detector has been disclosed which uses an analog-to-digital converter (ADC) and a central processing unit (CPU) to measure the output voltage of a lithium cell.

However, in multitasking environment where the CPU works on more than one task at a time, the CPU varies in power consumption depending on the number of working tasks. Since the output voltage of the cell should be measured under a constant load condition, the CPU may run only a battery monitoring task to keep the power consumption thereof constant. In other words, a multitasking operating system (OS) should provides a special mode of operation which the battery monitoring task runs only.

SUMMARY OF THE INVENTION

An object of the present invention is to provide a method and system which can monitor the state of battery with reliability even in a multitasking environment.

Another object of the present invention is to provide a method and system which can achieve the reliable battery monitoring on a multitasking operating system without the need of a special operation mode for monitoring the battery.

According to the present invention, in a battery-powered electronic apparatus having a microprocessor therein, a task is stopped running on the microprocessor in response to a check timing signal and, after the task is stopped running on the microprocessor, an output voltage of the battery is detected. Subsequently, after resuming the task running on the microprocessor, the state of the battery is monitored based on the detected output voltage.

The task may be stopped running by the microprocessor holding a bus connected thereto in response to the check timing signal. After a lapse of a first time period which is not shorter than a time required for the task to stop running, the output voltage of the battery may be detected. The task may be stopped running by the microprocessor holding the bus in response to a direct memory access (DMA) request signal which is received at regular intervals.

Further, using a discharge characteristic of the battery, the remaining quantity of the battery may be estimated based on the detected output voltage.

DETAILED DESCRIPTION OF THE PREFERRED EMBODIMENTS

Figure 1:
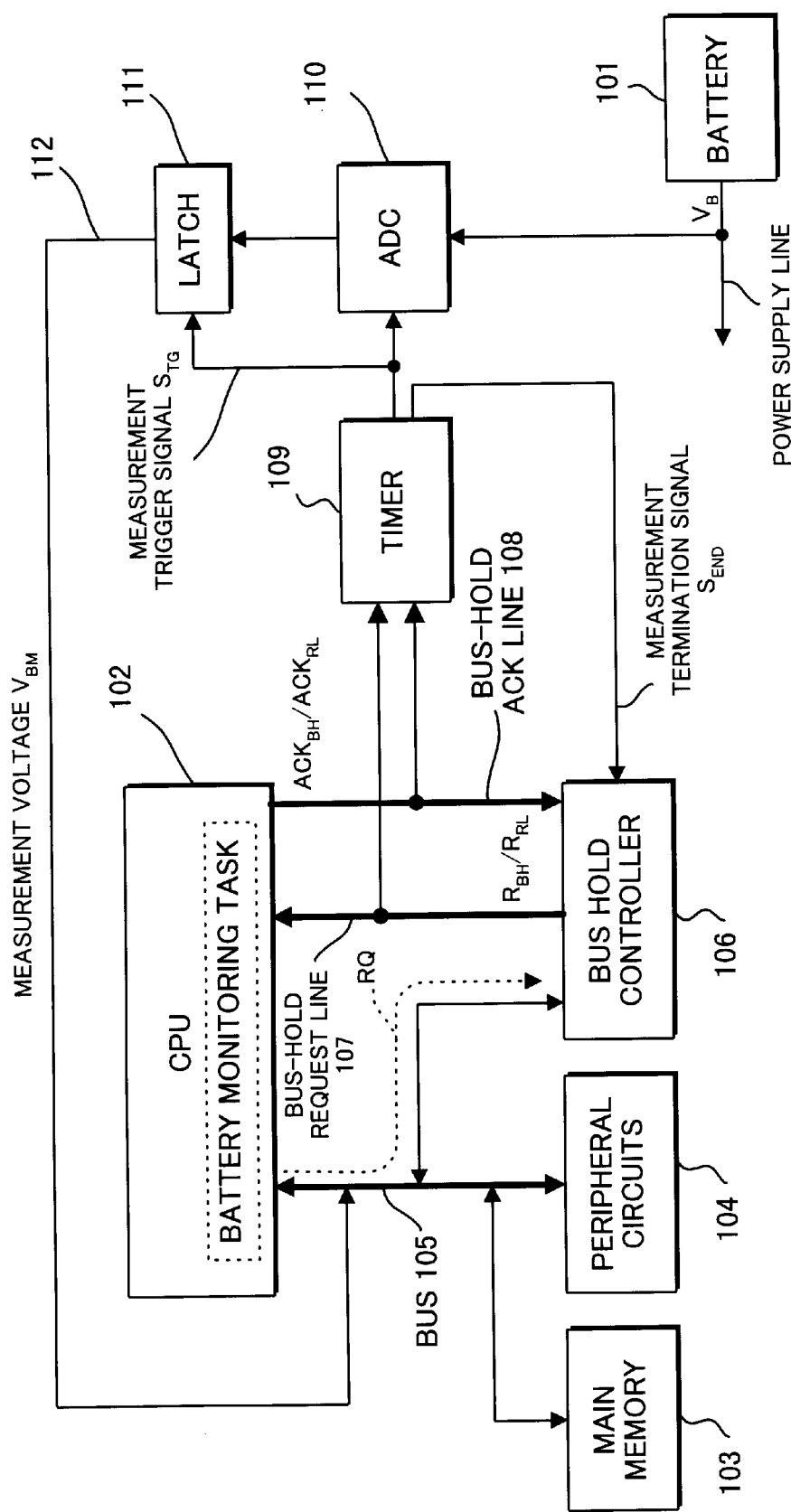
FIG. 1 is a block diagram showing a battery monitor for use in a portable battery-powered data processing apparatus according to a first embodiment of the present invention.
Figure 3:
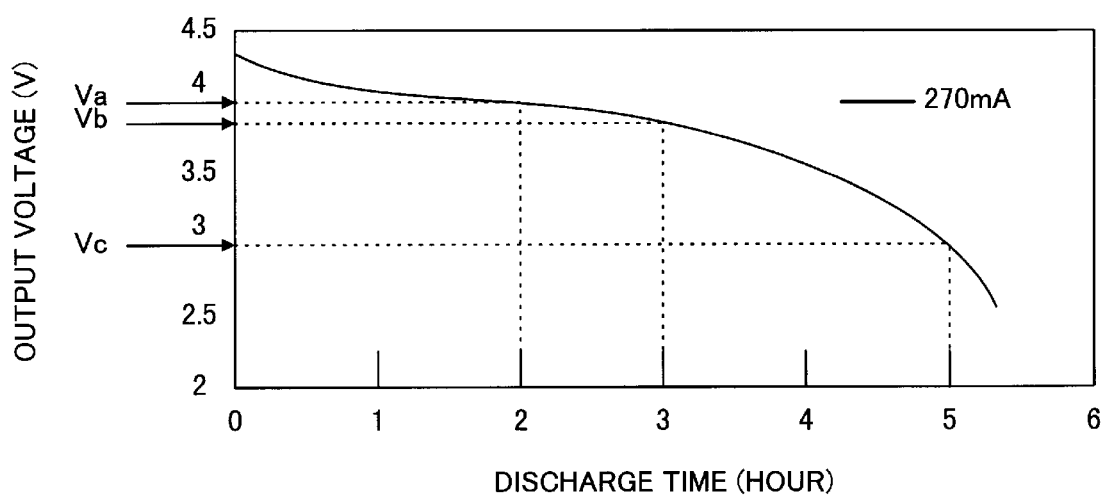
FIG. 3 is a graph showing the discharging characteristic of a lithium ion cell used in the data processing apparatus.

Referring to FIG. 1, there is shown a battery monitor for use in a portable data processing apparatus such as a palmtop or hand-held personal computer. The portable data processing apparatus is provided with a power source using a battery 101 which supplies power to each circuit block of the data processing apparatus through a power supply line. The battery 101 has a discharging characteristic such that the output voltage decreases with time as shown in FIG. 3. Here, a coke-base lithium ion cell is used as the battery 101.

The portable data processing apparatus is further provided with a central processing unit or a microprocessor (abbreviated as CPU) 102 which has the ability to fetch, encode/decode, and execute instructions and to transfer data to and from a main memory 103, peripheral circuits 104 and other resources over a bus 105. Further, the CPU 102 has the ability to hold the bus 105 so as to stop the progress of each task running therein. The CPU 102 is capable of working on a plurality of tasks for the portable data processing apparatus at a time in a multitasking OS. In this embodiment, running programs including a battery monitoring program are stored in the main memory 103 and the battery monitoring program starts up on the CPU 102 at regular intervals (for example, once every several minutes).

The CPU 102 is electrically connected to a bus hold controller 106 through a bus-hold request line 107 and a bus-hold acknowledge line 108 in addition to the bus 105. The bus hold controller 106 outputs a bus-hold request/release signal $R_{BH}/R_{RL}$ to the CPU 102 over the bus-hold request line 107 and inputs a bus-hold request/release acknowledge signal $ACK_{BH}/ACK_{RL}$ from the CPU 102 over the bus-hold acknowledge line 108.

The bus-hold request and acknowledge lines 107 and 108 are further connected to a timer 109. When receiving the bus-hold request acknowledge signal $ACK_{BH}$ from the CPU 102 over the bus-hold acknowledge line 108, the timer 109 starts counting to a first time period $T_1$ and further a second time period $T_2$. When having counted to the first time period $T_1$, the timer 109 outputs a measurement trigger signal $S_{TG}$ to an ADC 110 and a latch circuit 111. When further having counted to the second time period $T_2$, the timer 109 outputs a measurement termination signal $S_{END}$ to the bus hold controller 106.

In response to the measurement trigger signal $S_{TG}$, the ADC 110 converts the output voltage $V_B$ of the battery 101 into a digital form and the digital measurement voltage data $V_{BM}$ is latched into the latch circuit 111. The output terminal of the latch circuit 111 is electrically connected to the bus 105 so that the measurement voltage $V_{BM}$ is transferred to the CPU 102 through the bus 105.

As described above, the CPU 102 performs the multitask processing through the bus 105 and the battery monitoring task starts up at intervals of several minutes. The battery monitoring task starts the following sequence as shown in FIG. 2.

Figure 2:
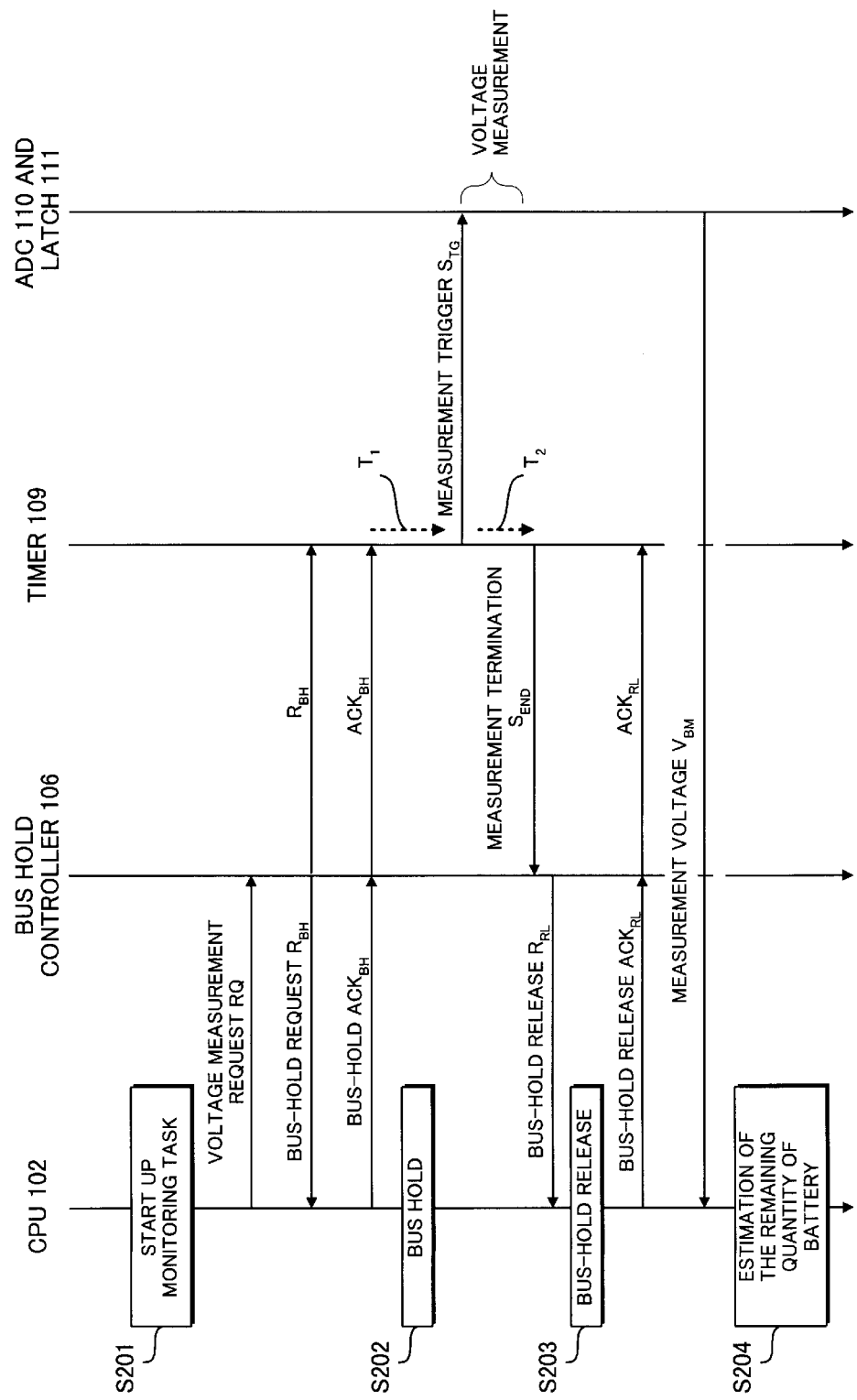
FIG. 2 is a diagram showing a sequence for battery monitoring in the first embodiment of FIG. 1.

Referring to FIG. 2, when the battery monitoring task starts up (step S201), it outputs a voltage measurement request RQ to the bus hold controller 106 through the bus 105. When receiving the voltage measurement request RQ from the CPU 102, the bus hold controller 106 outputs the bus-hold request signal $R_{BH}$ to the CPU 102 and the timer 109 over the bus-hold request line 107.

When receiving the bus-hold request signal $R_{BH}$ from the bus hold controller 106, the CPU 102 outputs the bus-hold request acknowledge signal $ACK_{BH}$ to the bus hold controller 106 and the timer 109 over the bus-hold acknowledge line 108 and holds the bus 105 (step S202). After the CPU 102 has held the bus 105, a task running on the CPU 102 cannot fetch a processing code. This causes the progress of all tasks including the battery monitoring task to be stopped. Therefore, after all tasks have been stopped working, the power consumption of the CPU 102 is kept constant. Since the peripheral circuits 104 vary in power consumption depending on the CPU 102 and the power consumption of circuits other than the CPU 102 and the peripheral circuit 104 is relatively small, the constant power consumption of the CPU 102 is considered to result in substantially constant power consumption of the portable data processing apparatus. In other words, the constant power consumption of the CPU 102 causes the load of the battery 101 to become constant.

When receiving the bus-hold request acknowledge signal $ACK_{BH}$ from the CPU 102, the timer 109 starts counting to the first time period $T_1$ which is set to more than the time that elapsed before the power consumption of the CPU 102 becomes constant. In the case where the CPU 102 does not have a large capacity of memory cache therein, the first time period $T_1$ may be the time corresponding to several clocks, for example.

When the timer 109 has counted to the first time period $T_1$, the timer 109 outputs the measurement trigger signal $S_{TG}$ to the ADC 110 and the latch circuit 111. The measurement trigger signal $S_{TG}$ starts the battery voltage measurement through the ADC 110 and the latch circuit 111. More specifically, upon the receipt of the measurement trigger signal $S_{TG}$, the ADC 110 converts the output voltage $V_B$ of the battery 101 into a digital form and the digital measurement voltage data $V_{BM}$ is latched into the latch circuit 111. The second time period $T_2$ is set to more than the time that elapsed after a lapse of the first time period $T_1$ before the measurement voltage data $V_{BM}$ is latched into the latch circuit 111. Therefore, when having counted to the second time period $T_2$, the timer 109 outputs the measurement termination signal $S_{END}$ to the bus hold controller 106.

When receiving the measurement termination signal $S_{END}$ from the timer 109, the bus hold controller 106 outputs the bus-hold release signal $R_{RL}$ to the CPU 102 and the timer 109 over the bus-hold request line 107. Upon the receipt of the bus-hold release signal $R_{RL}$, the CPU 102 releases the bus from the bus hold state (step S203) and then sends the bus-hold release acknowledge signal $ACK_{RL}$ back to the bus hold controller 106 and the timer 109 over the bus-hold acknowledge line 108. The bus-hold release acknowledge signal $ACK_{RL}$ causes the timer 109 to be reset.

When the bus hold is released, the battery monitoring task resuming on the CPU 102 inputs the measurement voltage data $V_{BM}$ from the latch circuit 111 and then performs the estimation of the remaining power quantity of the battery 101 (step S204). More specifically, the CPU 102 has a random access memory (not shown) connected thereto and the RAM previously stores sample data indicative of the discharge characteristic of the battery 101. The battery monitoring task compares the measurement voltage data $V_{BM}$ with the sample data to determined the remaining power quantity of the battery 101. The details will be described hereinafter.

In FIG. 3, there is shown an example of the discharge characteristic of the battery 101 in the case of the coke-base lithium ion cell which is usable for 5 hours with the minimum discharge current of 270 mA. The sample data as shown in this figure is stored in the RAM and is compared with the measurement voltage data $V_{BM}$ by the battery monitoring task running on the CPU 102. For example, in the case of $V_{BM}$=Va, the discharge time is 2 hours. Therefore, in this case, the remaining quantity of battery is estimated at 60% which is obtained by calculation: (5−2)÷5×100. In the case of $V_{BM}$=Vb, the discharge time is 3 hours. Therefore, in this case, the remaining quantity of battery is estimated at 40% which is obtained by calculation: (5−3)÷5×100. Further, In the case of $V_{BM}$=Vc, the discharge time is 5 hours. Therefore, in this case, the remaining quantity of battery is estimated at 0% which is obtained by calculation: (5−5)÷5×100.

In this manner, each time the voltage measurement request RQ is output to the bus hold controller 106, the remaining quantity of battery is checked in the constant load state of the battery 101 caused by the CPU 102 holding the bus 105. Therefore, the battery check is easily preformed with reliability even in the multitasking environment.

Figure 4:
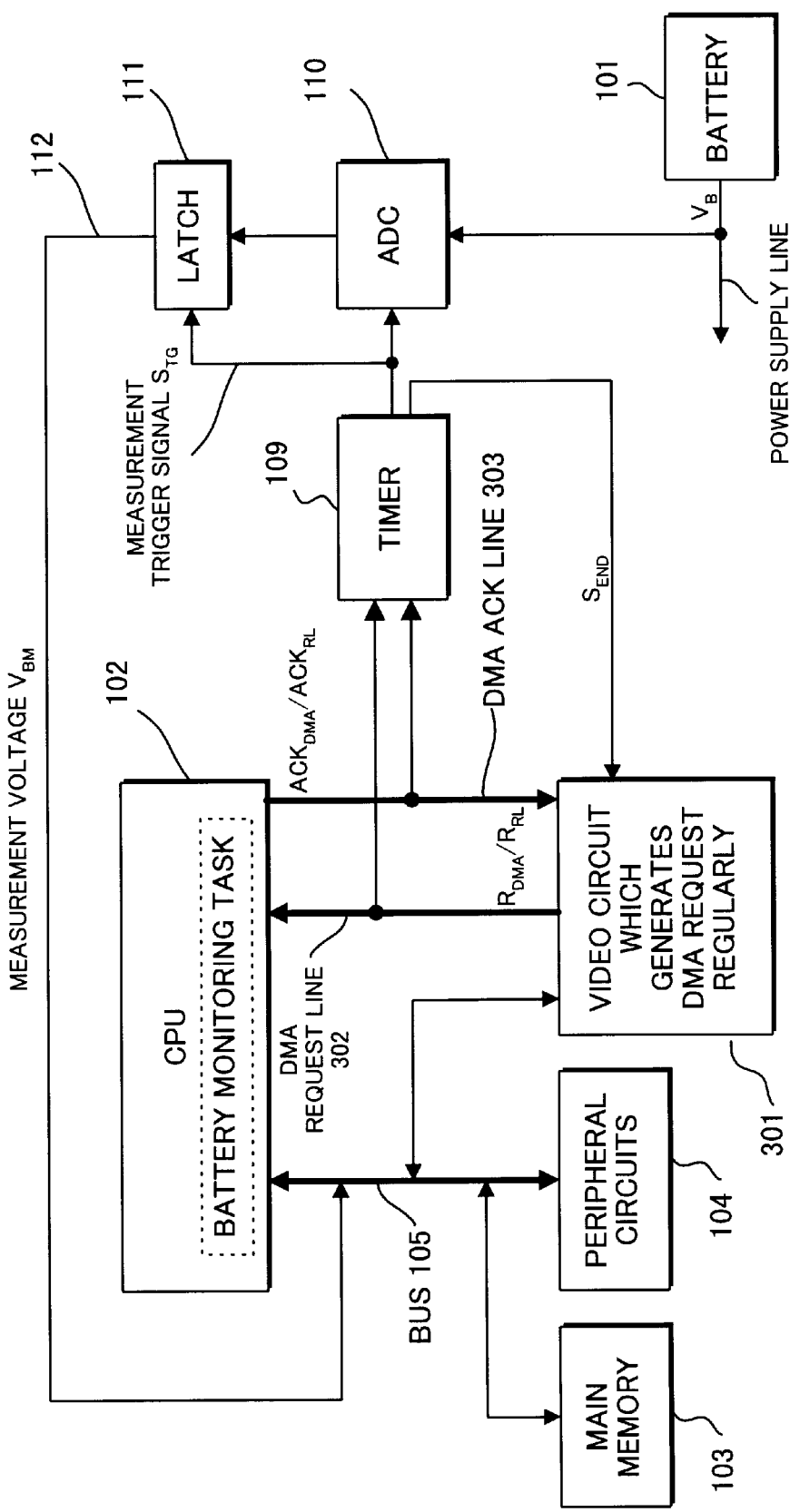
FIG. 4 is a block diagram showing a battery monitor for use in a portable battery-powered data processing apparatus according to a second embodiment of the present invention.

Referring to FIG. 4, there is shown a second embodiment of the present invention, where circuit blocks similar to those previously described with reference to FIG. 1 are denoted by the same reference numerals and the details are omitted.

The portable data processing apparatus as shown in FIG. 4 is provided with a circuit 301 which regularly generates a DMA (direct memory access) request. As an example, a video circuit may be used. The CPU 102 is electrically connected to the circuit 301 through a DMA request line 302 and a DMA acknowledge line 303 in addition to the bus 105. The circuit 301 outputs a DMA request/release signal $R_{DMA}$/$R_{RL}$ to the CPU 102 over the DMA request line 302 and inputs a DMA request/release acknowledge signal $ACK_{DMA}$/$ACK_{RL}$ from the CPU 102 over the DMA acknowledge line 303. The DMA request and acknowledge lines 302 and 303 are further connected to the timer 109 as in the case of FIG. 1.

Since the circuit 301 outputs the DMA request signal $R_{DMA}$ over the DMA request line 302 at regular intervals, the CPU 102 receives the measurement voltage data $V_{BM}$ from the latch circuit 111 regularly without the need of generating the voltage measurement request RQ. More specifically, when receiving the DMA request signal $R_{DMA}$ from the circuit 301, the CPU 102 outputs the DMA request acknowledge signal $ACK_{DMA}$ to the circuit 301 and the timer 109 over the DMA acknowledge line 301 and holds the bus 105 (step S202 of FIG. 2). This causes the progress of all tasks including the battery monitoring task to be stopped. Therefore, after all tasks have been stopped working, the power consumption of the CPU 102 is kept constant.

When receiving the DMA request acknowledge signal $ACK_{DMA}$ from the CPU 102, the timer 109 starts counting to the first time period $T_1$. After a lapse of the first time period $T_1$, the timer 109 outputs the measurement trigger signal $S_{TG}$ to the ADC 110 and the latch circuit 111. The measurement trigger signal $S_{TG}$ starts the battery voltage measurement within the second time period $T_2$ as described before. When having counted to the second time period $T_2$, the timer 109 outputs the measurement termination signal $S_{END}$ to the circuit 301.

When receiving the measurement termination signal $S_{END}$ from the timer 109, the circuit 301 outputs the DMA release signal $R_{RL}$ to the CPU 102 and the timer 109 over the DMA request line 302. Upon the receipt of the DMA release signal $R_{RL}$, the CPU 102 releases the bus from the bus hold state (step S203 of FIG. 2) and then sends the DMA release acknowledge signal $ACK_{RL}$ back to the circuit 301 and the timer 109 over the DMA acknowledge line 303. When the bus hold is released, the battery monitoring task resuming on the CPU 102 inputs the measurement voltage data $V_{BM}$ from the latch circuit 111 and then performs the estimation of the remaining power quantity of the battery 101 as described before.

In the second embodiment, the CPU 102 receives the measurement voltage data $V_{BM}$ regularly without the need of generating the voltage measurement request RQ. Therefore, the battery 101 is easily monitored with more simplified hardware and software than the first embodiment.

As described above, the present invention has advantages that a battery monitoring task can be easily implemented in a multitasking environment of a battery-powered portable data processing apparatus because there is no need of the special mode of operation to monitor the battery, resulting in a broader range of choices in operating systems.

What is claimed is:

1. A method for monitoring a battery in a battery-powered electronic apparatus having a microprocessor therein, the method comprising the steps of:

a) stopping a task running on the microprocessor in response to a check timing signal;

b) detecting an output voltage of the battery after the task is stopped running on the microprocessor;

c) resuming the task running on the microprocessor after the output voltage has been detected; and d) monitoring a state of the battery based on the detected output voltage.

2. The method according to claim 1, wherein the microprocessor has a function of holding a bus connected thereto, wherein the step a) comprises:

receiving the check timing signal over a line other than the bus; and holding the bus in response to the check timing signal to stop the task running.

3. The method according to claim 2, wherein the step b) comprises:

waiting a first time period which is not shorter than a time required for the task to stop running; and detecting the output voltage of the battery after a lapse of the first time period.

4. The method according to claim 2, wherein the step b) comprises:

waiting a first time period which is not shorter than a time required for a power consumption of the microprocessor to become constant; and detecting the output voltage of the battery after a lapse of the first time period.

5. The method according to claim 1, wherein the step a) comprises:

receiving the check timing signal at regular intervals; and stopping the task running on the microprocessor when receiving the check timing signal.

6. The method according to claim 5, wherein the check timing signal is generated depending on a check request signal generated by a monitoring task running on the microprocessor.

7. The method according to claim 1, wherein the microprocessor has a function of holding a bus connected thereto, wherein the step a) comprises:

receiving the check timing signal at regular intervals; and holding the bus to stop the task running on the microprocessor when receiving the check timing signal.

8. The method according to claim 7, wherein the check timing signal is a direct memory access (DMA) request signal.

9. The method according to claim 1, wherein the step d) comprises:

estimating a remaining quantity of the battery based on the detected output voltage using a discharge characteristic of the battery.

10. A system for monitoring a battery in a battery powered electronic apparatus having a microprocessor therein, the microprocessor having a function of stopping a task running thereon in response to a first signal, the system comprising:

a signal generator for generating the first signal to output it to the microprocessor when checking an output voltage of the battery;

a detector for detecting an output voltage of the battery to produce detected output voltage data after the task is stopped running on the microprocessor; and a monitor for monitoring a state of the battery based on the detected output voltage data.

11. The system according to claim 10, wherein the microprocessor has a bus and a first line connected thereto, the bus connecting the microprocessor with a main memory thereof, wherein the microprocessor stops the task running thereon by holding the bus in response to the first signal and inputs the first signal from the signal generator over the first line.

12. The system according to claim 11, wherein the detector comprises:

a timer for generating a trigger signal after a lapse of a first time period from when the microprocessor holds the bus, the first time period being not shorter than a time required for the task to stop running;

a voltage detector for detecting the output voltage of the battery in response to the trigger signal; and a storage for storing the detected output voltage data.

13. The system according to claim 12, wherein the timer further generates a termination signal after a lapse of a second time period from expiration of the first time period, the second time period being not shorter than a time required for the voltage detector to detect the output voltage of the battery, wherein the microprocessor releases the bus from a hold state to drive the bus in response to the termination signal.

14. The system according to claim 10, wherein the monitor is implemented as a monitoring task in the microprocessor.

15. The system according to claim 14, wherein the microprocessor has a bus and a first line connected thereto, the bus connecting the microprocessor with a main memory thereof, wherein the microprocessor stops the task running thereon by holding the bus in response to the first signal received from the signal generator over the first line and the microprocessor resumes the task by releasing the bus from a hold state to drive the bus in response to a second signal received from the signal generator over the first line, wherein the monitor monitors the state of the battery based on the detected output voltage data after the microprocessor resumes the task.

16. The system according to claim 15, wherein the detector comprises:

a timer for generating a trigger signal after a lapse of a first time period from when the microprocessor holds the bus, the first time period being not shorter than a time required for the task to stop running and generating the second signal after a lapse of a second time period from expiration of the first time period, the second time period being not shorter than a time required for the voltage detector to detect the output voltage of the battery;

a voltage detector for detecting the output voltage of the battery in response to the trigger signal; and a storage for storing the detected output voltage data.

17. The system according to claim 10, wherein the signal generator is a DMA circuit which generates a DMA request signal as the first signal.

18. The system according to claim 17, wherein the DMA circuit is a video circuit which generates the DMA request signal at regular intervals.

19. A portable data processing apparatus comprising:

a battery as a power supply;

a microprocessor for processing data in a multitasking environment, the microprocessor having a function of stopping a task running thereon in response to a first signal;

a signal generator for generating the first signal to output it to the microprocessor when checking an output voltage of the battery;

a detector for detecting an output voltage of the battery to produce detected output voltage data after the task is stopped running on the microprocessor; and a monitor for monitoring a state of the battery based on the detected output voltage data.

20. The portable data processing apparatus according to claim 19, wherein the microprocessor has a bus and a first line connected thereto, the bus connecting the microprocessor with a main memory thereof, wherein the microprocessor stops the task running thereon by holding the bus in response to the first signal and inputs the first signal from the signal generator over the first line.

* * * * *

UNITED STATES PATENT AND TRADEMARK OFFICE
CERTIFICATE OF CORRECTION

PATENT NO. : 5,959,435
DATED : September 28, 1999
INVENTOR(S) : IKEGAMI

It is certified that error appears in the above-identified patent and that said Letters Patent is hereby corrected as shown below:

Title page, insert item [30] to read:

Foreign Application Priority Data:
  10/31/1996   [JP] Japan ........................8-303667 --.

Signed and Sealed this

Twenty-third Day of May, 2000

*Attest:*

Q. TODD DICKINSON

*Attesting Officer*      *Director of Patents and Trademarks*